March 3, 1970 R. C. HANSEN 3,498,500
LEVEL SENSOR

Filed Feb. 13, 1968 3 Sheets-Sheet 1

INVENTOR.
RUSSELL C. HANSEN
BY
ATTORNEYS

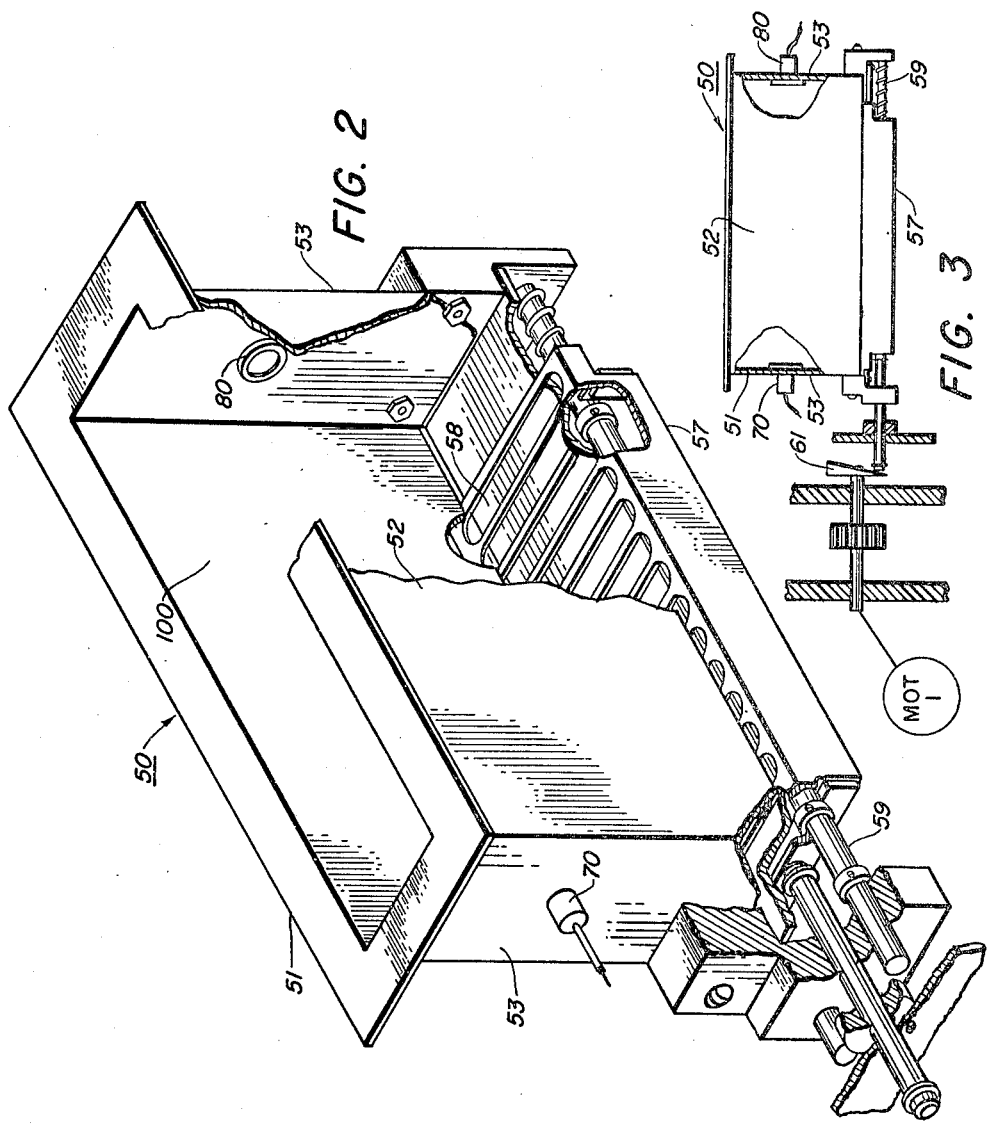

INVENTOR.
RUSSELL C. HANSEN

United States Patent Office 3,498,500
Patented Mar. 3, 1970

3,498,500
LEVEL SENSOR
Russell C. Hansen, Tilton, N.H., assignor to Xerox Corporation, Rochester, N.Y., a corporation of New York
Filed Feb. 13, 1968, Ser. No. 705,152
Int. Cl. B67d 5/38, 5/06; H01h 35/24
U.S. Cl. 222—23
8 Claims

ABSTRACT OF THE DISCLOSURE

A level sensing controller for determining the quantity of xerographic toner powder in the toner powder dispenser of an automatic xerographic reproducing machine wherein an electro-audio transducer emits an acoustical signal to be received by an audio-electro transducer generating an electrical signal coupled to a threshold detecting circuit for activating a suitable indicator when the quantity of toner powder contained within the dispensing cavity is below a level predetermined for optimum machine operation.

BACKGROUND OF THE INVENTION

This invention relates to level sensing apparatus and in particular to a control circuit and apparatus for indicating the presence of material in a granular material dispenser.

More specifically, this invention relates to a control circuit and apparatus for determining the presence of electroscopic toner powder in the retaining chamber of a toner-powder dispenser utilized in an automatic xerographic reproducing machine.

In the process of xerography, a xerographic plate having a layer of photoconductive material on a conductive backing is given a uniform electrostatic charge over its surface and then exposed to the subject matter to be reproduced by various projection techniques. This exposure discharges the plate in accordance with the light intensity reaching it, thereby, creating a latent electrostatic image on or in the plate.

Development of the image is effected by developers which comprise, in general, a mixture of suitable pigmented or dyed resin-based powder, hereinafter referred to as toner, and a granular carrier material which functions to generate triboelectric charges on, and to carry the toner. More specifically, the function of the carrier material is to provide mechanical control of the toner or to carry the toner to an image surface and simultaneously, provide almost complete homogeneity of charge polarity. In the development of the image, the toner powder is brought into surface contact with the photoconductive coating and is held thereon electrostatically in a pattern corresponding to the latent electrostatic image. Thereafter, the developed xerographic image may be transferred to a support material to which it may be fixed by any suitable means such as heat fusing.

In the mixture of toner particles and carrier material, the toner particles which are many times smaller than the carrier material, adhere to and coat the surface of the carrier material due to the triboelectric attraction therebetween. During development, as the toner-coated carrier material rolls or tumbles over the xerographic plate carrying an electrostatic image of opposite polarity to the charge of the toner, toner particles are pulled away from the carrier by the latent electrostatic image and deposited on the plate to form a developed toner-powder image. As toner-powder images are formed, additional toner powder must be supplied to the developer mixture to replenish the toner deposited on the xerographic plate. The toner material may be of the type disclosed in Carlson Patent No. 2,940,934, wherein the toner particles comprise a finely divided pigmented resin having a particle size less than 20 microns and preferably an average particle size between about 5 and 10 microns and comprising a finely divided uniform mixture of pigment in a non-tacky, low-melting resin. Desirably, the pigment will be a black pigment such as carbon black or other minutely divided carbonacious pigment.

As the toner powder in the developer mixture is depleted during the development of the latent image on the xerographic plate, more toner powder must be added to prevent faint copies having low contrast. A suitable apparatus for dispensing toner powder into the developer mixture is disclosed in R. A. Hunt, U.S. Patent No. 3,013,-703 issued Dec. 19, 1961, and reference is made thereto for the details of the dispensing apparatus disclosed therein.

As toner powder is dispensed from the dispensing apparatus in metered quantities, the quantity contained therein gradually becomes depleted. In the operation of high speed, high volume automatic xerographic reproducing machines, it is desirable to have means for indicating when the supply of toner powder in the dispensing apparatus has become nearly depleted so that an operator may add more powder to obtain optimum quality xerographic reproductions. Heretofore this determination of the quantity of toner powder in the dispensing apparatus was accomplished by means of an indicator rod which was lowered by the machine operator into the developer material to indicate the quantity remaining therein by the operator visually noting the quantity of toner powder remaining by graduations on the rod. The disadvantage of handling toner material in this manner is the tendency of the toner powder, due to its minute size, to become airborne when the dispenser is opened by the machine operator. This airborne toner powder contaminates the surrounding area with carbon black particles, blackening the operator's hands and clothing, creating an undesirable working condition. In addition, due to the toner powder's affinity for triboelectrification, the toner powder handled in this manner has a tendency to become electrostatically attracted to various apparatus having a small charge of opposite polarity and, therefore, a system for determining the level of the toner powder in the xerographic toner powder dispenser must be free from the effects of triboelectrification.

The present invention comprises a new method and apparatus for determining the level of electroscopic toner powder in the retaining chamber of a xerographic toner powder dispenser.

SUMMARY OF THE INVENTION

It is, therefore, an object of this invention to improve level sensing apparatus.

Another object of this invention is to improve level sensing apparatus for determining the presence of electroscopic xerographic toner powder.

A further object of this invention is to improve level sensing apparatus for use in xerographic toner-powder dispensers by automatically sensing the level of the toner powder contained therein without manual contact with the dispensing apparatus.

Still another object of this invention is to improve level sensing apparatus for use in a xerographic toner-powder dispenser by sensing the level of electroscopic toner powders contained therein by means of an apparatus independent of machine operation.

These and other objects are obtained in accordance with the present invention wherein there is provided a xerographic toner-powder level sensor including a transmitter and receiver positioned in opposite sides of the xerographic toner dispenser whereby an acoustic signal emitted from the transmitter will be received by the receiver to be thereby connected to a suitable threshold detector whereby the magnitude of the signal received is compared to a predetermined level for actuating a suitable indicator when it is determined that the level of toner powder in the xerographic toner-powder dispenser has depleted beyond a certain minimal quantity.

DESCRIPTION OF THE DRAWINGS

Further objects of this invention, together with additional features contributing thereto and advantages accruing therefrom, will be apparent from the following description of one embodiment of the invention when read in conjunction with the accompanying drawings, wherein:

FIG. 2 is an enlarged perspective view of the toner dispensing apparatus utilized in the automatic xerographic reproducing machine illustrated in FIG. 1;

FIG. 3 is a schematic representation of the toner powder dispensing apparatus to better illustrate the drive mechanism therefor;

DESCRIPTION OF THE PREFERRED EMBODIMENT

Figure 1:
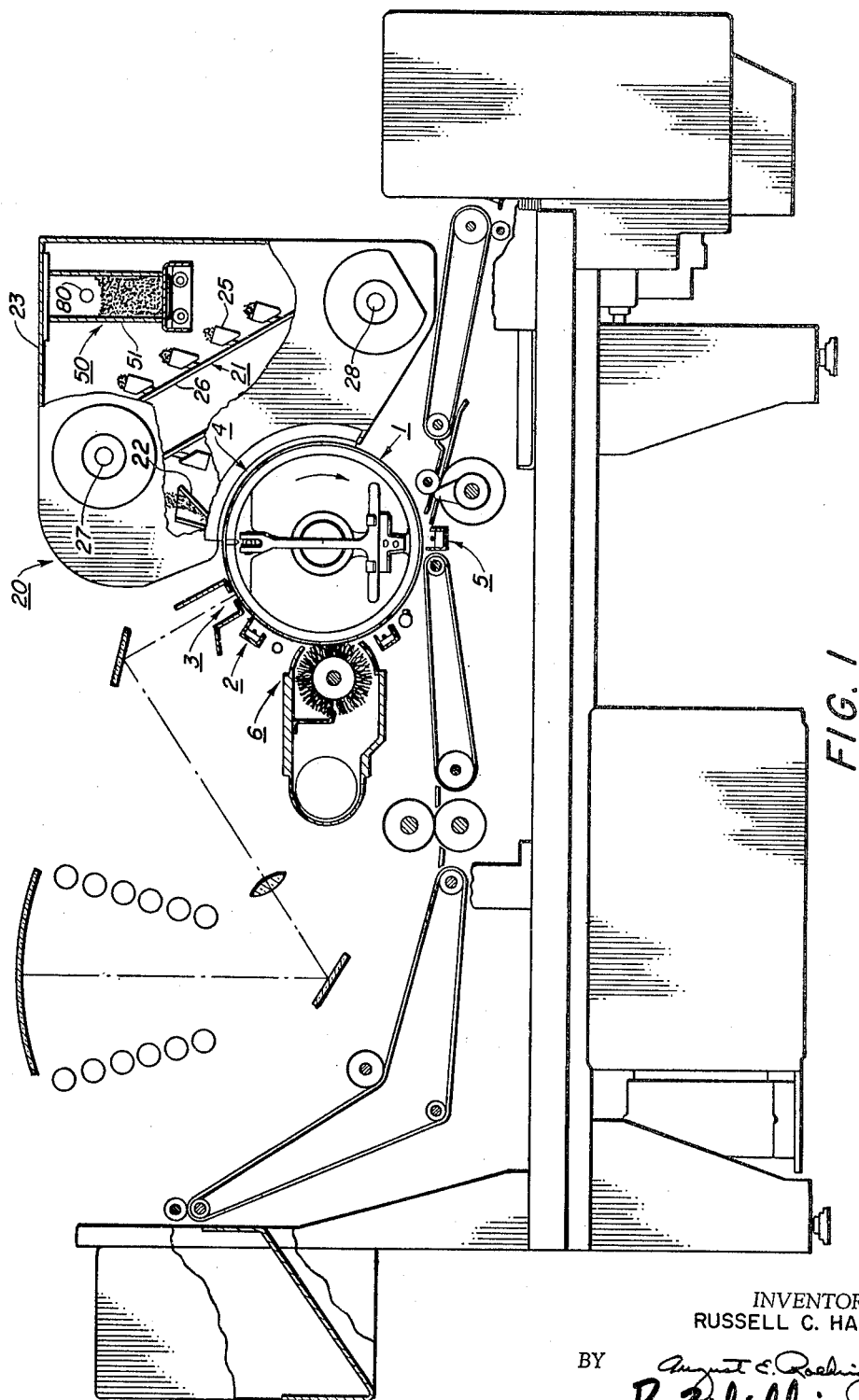
FIG. 1 is a schematic illustration of an automatic xerographic reproducing apparatus utilizing the invention.

Referring now to FIG. 1, there is shown an embodiment of the subject invention in a suitable environment such as an automatic xerographic reproducing machine, although it should be noted that the invention is not intended to be limited thereto.

The automatic xerographic reproducing machine includes a xerographic plate 1 including a photoconductive layer or light receiving surface on a conductive backing journaled in a frame to rotate in the direction indicated by the arrow to cause the plate surface to sequentially pass a series of xerographic processing stations.

For the purpose of the present disclosure, the several xerographic processing stations in the path of movement of the plate surface may be described functionally as follows:

A charging station 2 at which a uniform electrostatic charge is deposited on or in the photoconductive plate;

An exposure station 3 at which a light or radiation pattern of copy to be reproduced is projected onto the plate surface to dissipate the charge in the exposed areas thereof, to thereby form a latent electrostatic image of the copy to be reproduced;

A developing station 4 at which the xerographic developing material, including toner particles having an electrostatic charge opposite to that of the latent electrostatic image, is cascaded over the plate surface whereby the toner particles adhere to the latent electrostatic image to form a toner-powder image in configuration of the copy being reproduced;

A transfer station 5 at which the toner powder image is electrostatically transferred from the plate surface to a transfer material or a support surface; and A drum cleaning and discharge station 6 at which the plate surface is brushed to remove residual toner particles remaining thereon after image transfer, and exposed to a relatively bright light source to effect substantially complete discharge of any residual electrostatic charge remaining thereon or therein.

The developing station 4 which effects development of the latent electrostatic image of the cylindrical xerographic plate, comprises a developer apparatus 20 which coacts with the cylindrical plate to develop the latent electrostatic image on or in the plate surface by means of the xerographic toner-powder. Mounted within the developer housing is a driven bucket-type conveyor 21 used to carry the developer material previously supplied to the developer housing to the upper portion of the developer housing from which point the developer material is cascaded over the hopper chute 22 onto the drum. As the developer material cascades over the drum, toner particles of the developer material adhere electrostatically to the previously formed latent electrostatic image areas on the drum, the remaining developer material falling off the peripheral surface of the drum to be deflected by suitable baffle plates into the bottom or sump portion of the developer housing. Toner particles consumed during the developing operation to form the visible powder images are replenished by a toner dispenser 50 mounted within the developer housing.

The bucket-type conveyor 21 is used to convey the developer material from the sump portion to the upper portion of the developer housing from where it is cascaded over the xerographic drum. As shown, the conveyor 21 includes a series of parallel spaced buckets 25 secured to a suitable pair of conveyor belts 26 passing around a conveyor drive pulley 27 and a conveyor idler pulley 28 secured on drive and idler shafts to rotate therewith, and powered by a suitable motor. For further details concerning the specific construction for a suitable developer apparatus reference is made to W. G. Lewis et al. U.S. Patent No. 3,067,720.

As the developing mixture is cascaded over the xerographic drum, toner particles are pulled away from the carrier and deposited on the drum to form toner-powder images, while the partially denuded carrier particles pass off the drum into the sump portion of the developer housing. As toner powder images are formed, additional toner particles must be supplied to the developing mixture in proportion to the amount of toner deposited on the drum. To supply additional toner particles to the developing mixture, the toner dispenser 50 is used to accurately meter toner to the developer mixture. Although any one of a number of well-known powder or granular material dispensers may be used, the toner dispenser shown is of the type disclosed in U.S. Patent No. 3,013,703, issued Dec. 19, 1961, to R. A. Hunt.

The toner dispenser 50 comprises a hopper or container 51 for the xerographic toner particles to be dispensed. Although the hopper or container 51 may be made in any size or shape, the hopper shown is formed as a rectangular open ended box having vertical side and end walls, 52 and 53, respectively, the upper ends of the walls being bent outward to form horizontal flanges by means of which the hopper may be attached to the underside of top wall 23 of the developer housing, as by welding, with the opening and top wall 23 of the developer housing in alignment with the opening in the hopper. At opposite ends of the hopper are positioned depending bearing blocks for supporting the remaining elements of the toner dispenser, the bearing blocks being appropriately attached to the end walls.

The bottom of the hopper is partially closed by a dispensing plate 57 positioned and spaced in vertical relation below the lower edges of the walls of the hopper which combines with the walls of the hopper 51 to provide a reservoir having narrow elongated outlet slits or passages 58 for the flow of xerographic toner powder.

In the operation of the toner dispenser a supply of toner powder is placed within the hopper, the hopper walls and the dispensing plate forming a reservoir for the toner particles. Upon reciprocation of the dispensing plate as by motor MOT-1 driving cam 61 to effect axial motion of the spring biased plunger rod 59, a metered quantity of toner powder will be permitted to pass through the plate 57, where the powder will fall to the reservoir portion of the developer housing.

Since the toner dispenser 50 dispenses a substantially uniform quantity of toner for a given stroke of the dispensing plate, it is apparent that the quantity of toner delivered by the toner dispenser may be altered by varying the number of strokes per unit of time. Reciprocation of the dispensing plate is effected by means of the cam 61 secured to the end of the motor shaft coacting with the spring biased plunger rod 59 operatively connected to the dispensing plate 57.

It is felt that the preceding description of the toner dispenser 50 is sufficient for a better understanding of the subject matter of this invention. For further details relative to the specific construction of this dispensing apparatus, reference is made to the aforementioned Hunt patent.

Figure 4:
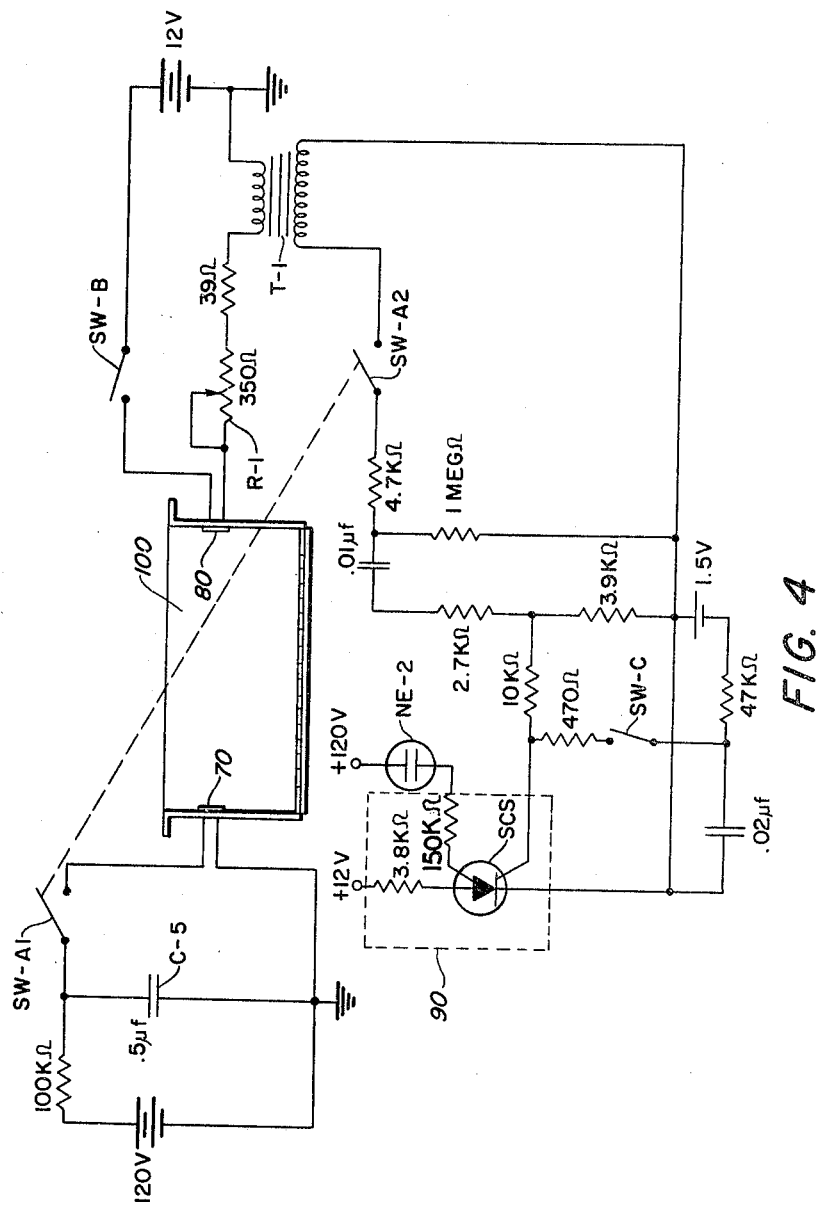
FIG. 4 is an electrical schematic of the xerographic toner powder level sensing device.

In order to determine the level of the xerographic toner powder contained in the toner dispenser 50, there is shown in FIG. 4 an electrical schematic diagram of an automatic level control system which ultimately energizes a suitable indicator in accordance with the level of the electroscopic xerographic toner-powder contained in the toner dispenser cavity formed by the side and end walls, lid 54 and toner powder.

As shown in FIG. 2, a suitable electro-audio transducer 70 is secured within the toner dispenser chamber on the end wall 53 at a level predetermined to be representative of the minimum level of toner powder contained within the dispenser for continued optimum machine operation. At the opposite end of the dispenser chamber, an audio-electro transducer 80 is secured to end wall 53 to receive the acoustical signal transmitted by the electro-audio transducer 70 and to convert this acoustical signal to an electrical signal coupled to a suitable threshold detector circuit. The electro-audio transducer 70 which may be any suitable source of an acoustical pulse compatible with the audio-electrical transducer 80 and the electrical schematic shown in FIG. 4, such as the microphone and earphone units of a conventional telephone hand set, is connected to an electrical circuit whereby upon closing a switch SW-A1, the capacitor C-5 is discharged through the electro-audio transducer 70 generating an acoustical pulse which shock excites the toner dispenser cavity resulting in an acoustical signal being received by the audio electrical transducer 80 comprised of the natural frequencies of the dispenser cavity under the given condition of the toner-powder level.

The acoustical signal received by the audio electrical transducer 80, which may be any suitable acoustical pulse receiver compatible with the audio-electro transducer 70 and the electrical schematic of FIG. 4, such as a conventional carbon microphone, receives the acoustical signal which is converted to an electrical signal and coupled to a silicon controlled switch circuit 90 for actuating a suitable indicator such as a neon lamp NE-2 in the event the toner powder supply has been depleted. The audio-electro transducer 80 is actuated by closing switch SW-B placing the testing apparatus in an operate condition for reception of a signal from the electro-audio transducer 70.

In operation of the testing apparatus in an automatic xerographic reproducing machine, switch SW-B could be replaced by contacts of a relay such that upon energization of the relay, as by depressing an "ON" button, the relay contacts would momentarily close placing the sensing apparatus in an operate mode. The signal received by the audio-electro transducer 80 is coupled to the primary winding of transformer T-1 which, through the secondary windings of the transformer, provides a signal to a voltage level sensing circuit including the silicon controlled switch circuit 90.

The silicon controlled switch SCS behaves as a peak amplitude sensor. When the toner level in the dispenser cavity is above the transducers 70 and 80, the voltage output from the electro-audio transducer 70 will be at a lesser level than when the toner powder contained in the cavity is below the level of the transducers. The amplitude of the voltage waveform can be varied by adjusting the potentiometer R-1 which regulates the current through the audio-electro transducer 80 thereby providing a method of threshold adjustment of the signal coupled to the silicon controlled switch circuit 90 through the transformer T-1.

It is desirable, due to the sensitivity of the testing apparatus; that the operating period of the sensor be during the time at which the automatic xerographic reproducing machine is at its quietest state. Since machine noises from motors, gear drives, solenoids, or operation of the toner powder dispenser itself might trigger the audio-electro transducer 80 it is desirable to gate the operating period of the sensor to coincide with the quietest state of machine operation. To facilitate an accurate determination of the quantity of toner powder reposing in the dispenser chamber the ganged double pole single throw switch SW-A (having contacts SW-A and SW-A2) is connected into the electrical circuit (FIG. 4) such that the sequential closing of contacts SW-A1 and SW-A2 would be less than 100 milliseconds thereby preventing triggering due to spurious noises by keeping an open circuit until contacts SW-A2 are closed and then sequentially closing contacts SW-A1 to initiate the test. Switch SW-A may be closed manually, or by any conventional, periodically acting, mechanism. When contacts SW-A1 are closed, the capacitor C-2 discharges into the electro-audio transducer 70 which thereby generates an acoustical pulse to shock excite the toner dispenser cavity, as heretofore described.

When the toner dispenser cavity 100 is full of toner powder, and until the quantity of toner powder contained therein is depleted such that the level approaches the level of the transducers 70 and 80, the cavity with respect to the transducers behaves as a low Q acoustical circuit. The amplitude of the acoustical pulse from the electro-audio transducer 70 is damped by the toner power material acting as an acoustical absorber and, therefore, the natural resonant frequencies of the toner dispenser cavity 100 are lower. This lowering of the natural resonant frequencies of the cavity also results in a decreased amplitude of the voltage signal received by the audio-electro transducer 80 coupled to the silicon control switch circuit 90 by means of the transformer T-1.

As the quantity of toner power contained in the toner dispenser cavity becomes depleted through operation of the automatic xerographic reproducing apparatus, the Q of the cavity increases to a value sufficient such that the acoustical signal generated through the electro-audio transducer 70 is no longer sufficiently absorbed by the acoustical absorber (toner powder) thereby increasing the natural resonant frequencies of the dispenser cavity and amplitude of the signal received by the audio-electro transducer 80 such that the electrical signal developed at the output of the audio-electro transducer 80, coupled to the transformer T-1 and thereafter through the resistance-capacitive coupling network to the input of the SCS, is sufficient to exceed the threshold level of the SCS as determined by potentiometer R-1. This voltage pulse is of a magnitude sufficient to allow the silicon controlled switch to conduct, lighting the indicator light NE-2 thereby signalling the need for toner powder replenishment. Since the input to the anode of the silicon controlled switch is a positive D.C. voltage, the SCS will remain latched in (conducting) and the indicator lamp will remain illuminated even after the pulse from transformer T-1 has terminated.

After the machine operator has replenished the depleted toner powder supply, reset switch SW–C is depressed thereby reverse biasing the cathode of the silicon controlled switch by means of the D.C. voltage supply (shown in FIG. 4) and terminating conduction of the silicon controlled switch and extinguishing the indicator lamp NE–2.

While there has been described one embodiment of the invention, it is intended that the invention be not limited to the exact form shown and described nor to anything less than the whole of the invention as set forth in the appended claims.

What is claimed is:

1. An apparatus for determining the quantity of electroscopic toner powder in a xerographic toner powder dispenser including:
   means defining a chamber for containing a quantity of xerographic toner power,
   electro-audio transducer means positioned within said means defining a chamber actuatable to emit an acoustical signal of a magnitude related to the quantity of toner power retained within said chamber defining means,
   electrical charge storage means and switch means coupled to said electro-audio transducer means such that upon actuation of said switch means said storage means is caused to activate said electro-audio transducer to emit an acoustical signal,
   audio-electro transducer means positioned within said means defining a chamber to receive an acoustical signal transmitted from said electro-audio transducer means,
   circuit means coupled to said audio-electro transducer means to generate an electrical signal pulse upon receipt by said audio-electro transducer means of an acoustical signal having a predetermined magnitude, and
   indicator means coupled to said circuit means to be activated upon receipt of a signal pulse from said circuit means.

2. A toner powder dispenser for use with an automatic xerographic reproducing machine including
   means defining a chamber for retaining a quantity of xerographic toner powder therein,
   a dispensing plate positioned to form a discharge outlet for the xerographic toner powder retained in said chamber defining means,
   means operatively connected to said dispensing plate for actuation thereof to dispense a metered quantity of xerographic toner powder from said chamber defining means,
   electro-audio transducer means positioned within said chamber defining means actuatable to emit an acoustical signal having an amplitude determined by the quantity of material within the chamber and the position of said electro-audio transducer means relative thereto,
   electrical charge storage means and switch means coupled to said electro-audio transducer means such that upon actuation of said switch means said storage means is caused to activate said electro-audio transducer to emit an acoustical signal,
   audio-electro transducer means positioned within said chamber defining means to receive an acoustical signal transmitted from said electro-audio transducer means,
   circuit means including a threshold detector to generate a pulse signal upon receipt by said audio-electro transducer means of an acoustical signal from said electro-audio transducer means of an amplitude sufficient to trigger said threshold detector, and
   indicating means coupled to said circuit means to be activated upon the generation of a pulse signal by said circuit means.

3. A toner dispenser for an automatic xerographic reproducing machine including,
   a hopper having end walls and side walls for containing toner powder,
   said hopper having an open bottom,
   a dispensing platform mounted below and in spaced relation to said hopper to form opposed discharge outlets with the side walls of said hopper,
   a toner powder dispensing member disposed for reciprocating movement between said hopper and said dispensing platform and having a path of movement substantially parallel to the side walls,
   said dispensing member constituting a rigid assembly including an open grid frame having spaced grid members extending traversely thereof,
   said grid members extending through said discharge outlets,
   means connected to said dispensing member for reciprocating said dispensing member,
   acoustical pulse generating means secured to one of said end walls,
   electrical charge storage means and switch means coupled to said acoustical pulse generating means such that upon actuation of said switch means said storage means is cause to actuate said acoustical pulse generating means to emit an acoustical signal,
   acoustical pulse receiving means secured to one of said end walls opposite said acoustical pulse generating means,
   threshold detecting means coupled to said acoustical pulse receiving means to detect a signal therefrom for comparison to a predetermined level, and
   indicator means actuatable upon receipt of a signal from said acoustical pulse receiving means sufficient to trigger said threshold detector means.

4. A level sensing apparatus for determining the quantity of material in a container including:
   means defining a chamber for containing a quantity of material therein,
   electro-audio transducer means positioned within said chamber defining means actuatable to emit an acoustical signal having an amplitude determined by the quantity of material within the chamber and the position of said electro-audio transducer means relative thereto,
   electrical charge storage means and switch means coupled to said electro-audio transducer means such that upon actuation of said switch means said storage means is caused to actuate said electro-audio transducer to emit an acoustical signal,
   audio-electro transducer means positioned within said chamber defining means to receive an acoustical signal transmitted from said electro-audio transducer means,
   circuit means including a threshold detector to generate a pulse signal upon receipt by said audio-electro transducer means of an acoustical signal from said electro-audio transducer means of an amplitude sufficient to trigger said threshold detector, and
   indicating means coupled to said circuit means to be activated upon the generation of a pulse signal by said circuit means.

5. The apparatus of claim 4 wherein said threshold detector includes a potentiometer electrically connected in series with said audio-electro transducer means to limit the current flow therethrough to define a threshold level.

6. The apparatus of claim 4 wherein said circuit means includes a pulse generator electrically coupled to said threshold detector to generate a signal pulse activating said indicating means upon the triggering of said threshold detector.

7. The apparatus of claim 4 wherein said circuit means includes a silicon controlled switch actuatable to a conducting state to activate said indicating means upon receipt by said audio-electro transducer means of an acoustical signal from said electro-audio transducer means of an amplitude sufficient to trigger said threshold detector.

8. The apparatus of claim 7 including means actuatable to reverse bias the cathode of said silicon controlled switch to place said switch in a non-conducting state thereby inactivating said indicating means.

References Cited

UNITED STATES PATENTS

| | | | |
|---|---|---|---|
| 2,176,562 | 10/1939 | Rose | 222—284 X |
| 2,235,928 | 3/1941 | Hardinge | 222—52 X |
| 3,158,291 | 11/1964 | Lytton et al. | 222—56 X |

FOREIGN PATENTS 1,241,275  8/1960  France.

SAMUEL F. COLEMAN, Primary Examiner

H. S. LANE, Assistance Examiner

U.S. Cl. X.R.

222—76; 200—61.01; 307—118

PO-1050
(5/69)

UNITED STATES PATENT OFFICE
CERTIFICATE OF CORRECTION

Patent No. 3,498,500  Dated  March 13, 1970

Inventor(s)  Russell C. Hanson

It is certified that error appears in the above-identified patent and that said Letters Patent are hereby corrected as shown below:

Column 5, line 44, "audio-electrical" should read --audio-electro--; lines 51-52, "audio-electrical" should read --audio-electro--; line 55, "audio-electrical" should read --audio-electro--; and line 57, "audio-electro" should read --electro-audio--.

SIGNED AND
SEALED

AUG 4 - 1970

(SEAL)
Attest:

Edward M. Fletcher, Jr.
Attesting Officer

WILLIAM E. SCHUYLER, JR.
Commissioner of Patents